Dec. 14, 1954  DE LOS E. HIBNER, JR  2,696,631
RETRACTABLE SOOT BLOWER CONTROL AND OPERATING SYSTEM
Filed Jan. 26, 1952  6 Sheets-Sheet 1

INVENTOR
DELOS E. HIBNER, JR.

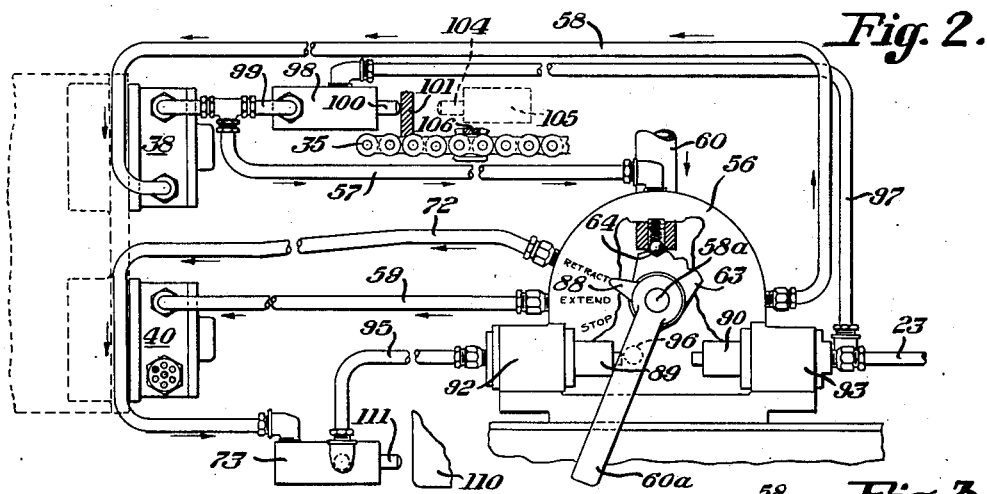
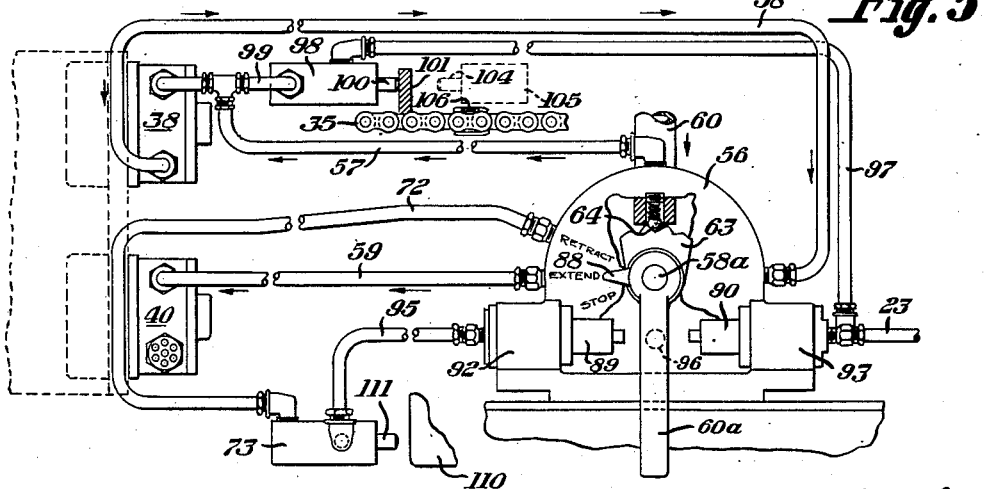
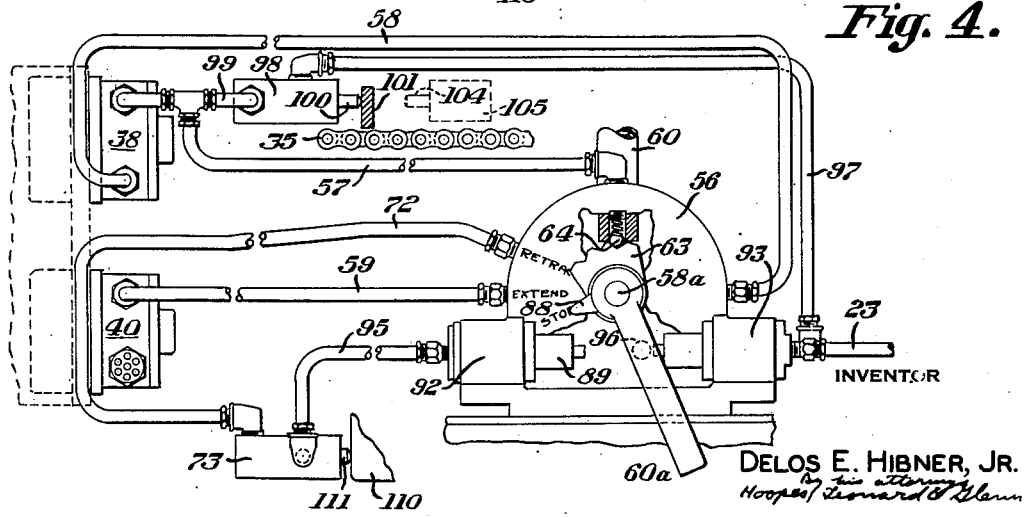

Dec. 14, 1954     DE LOS E. HIBNER, JR     2,696,631
RETRACTABLE SOOT BLOWER CONTROL AND OPERATING SYSTEM
Filed Jan. 26, 1952     6 Sheets-Sheet 3
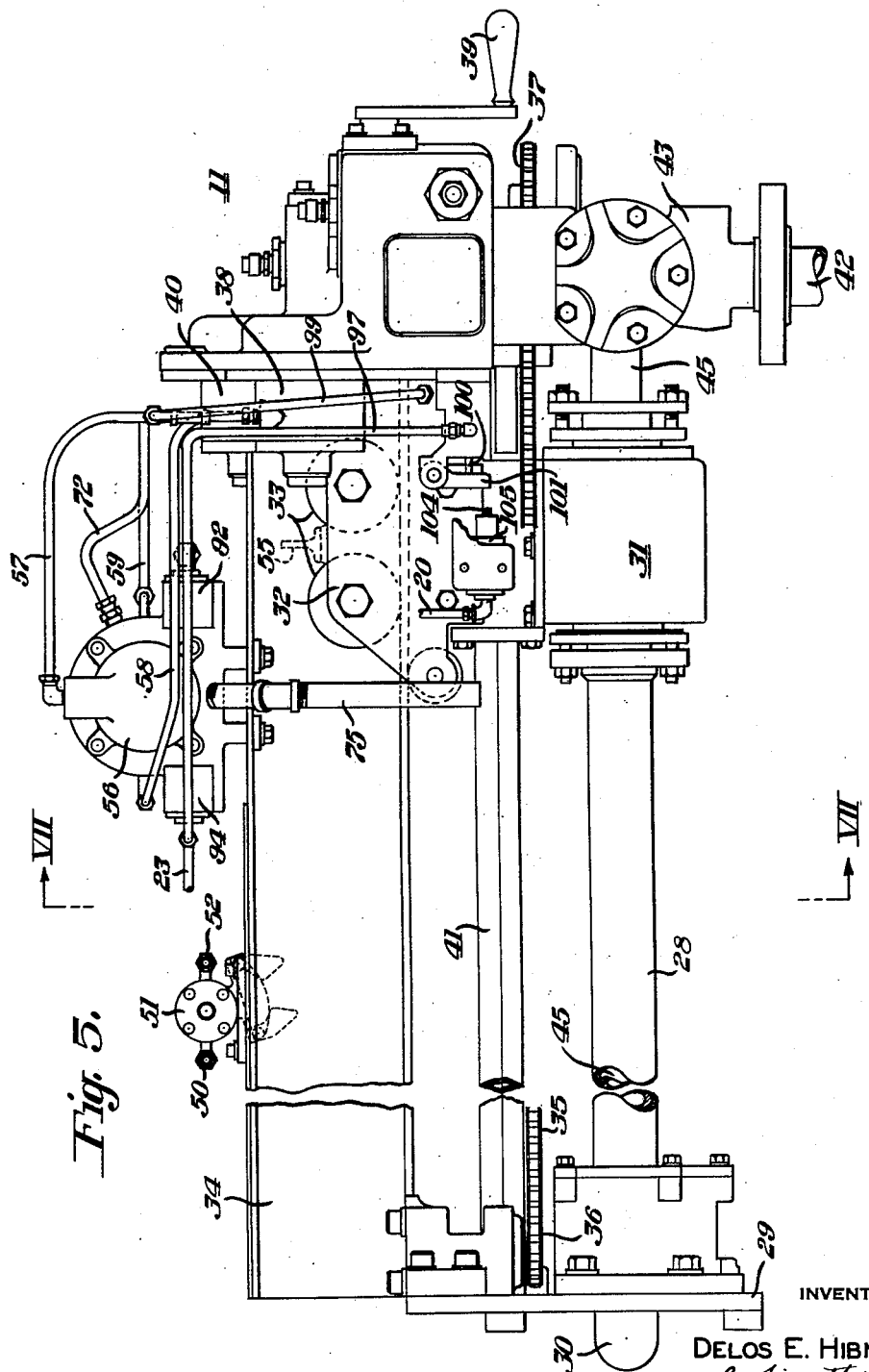
INVENTOR
DELOS E. HIBNER, JR.
By his attorneys
Hooper, Leonard & Glenn

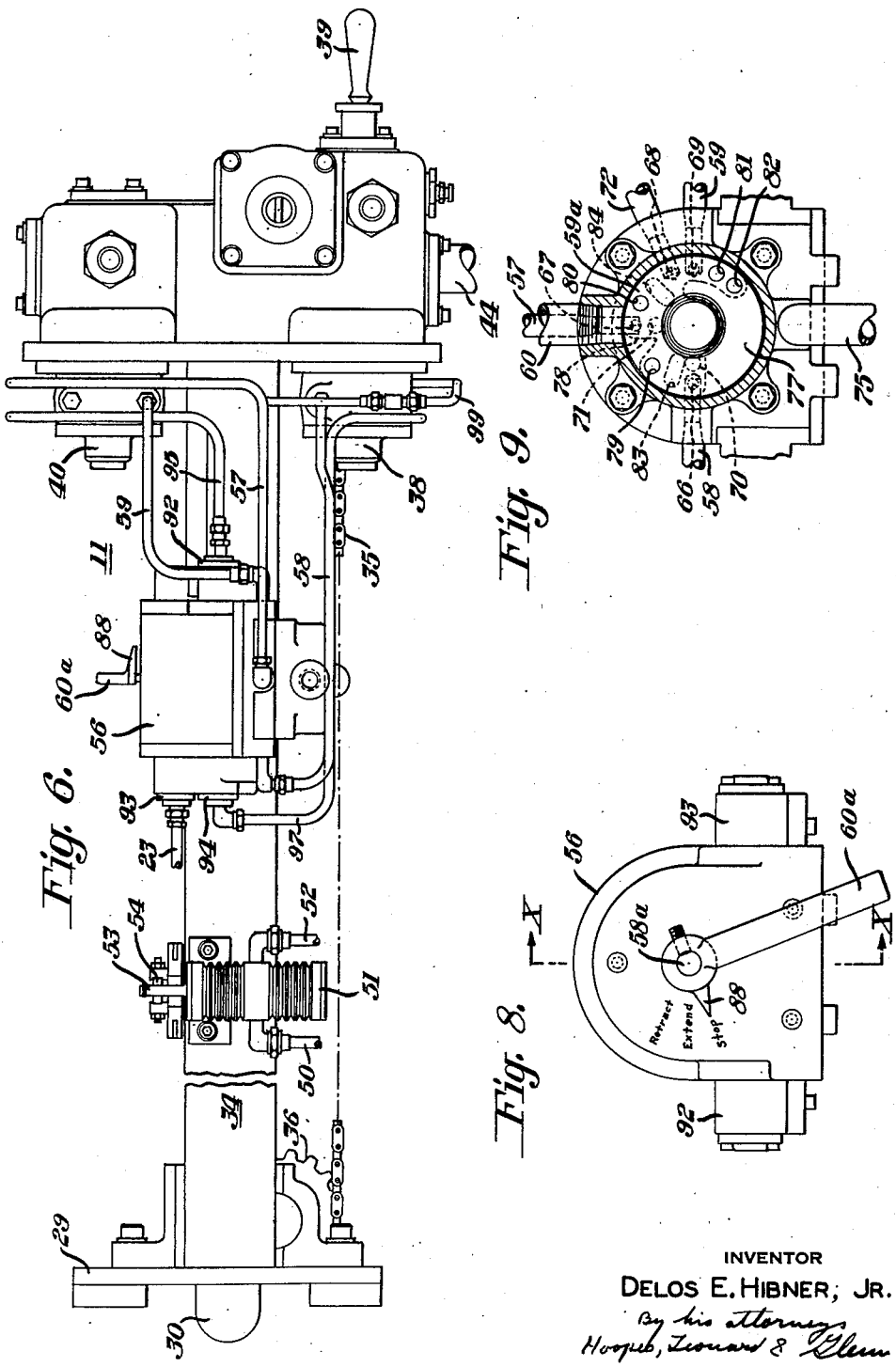

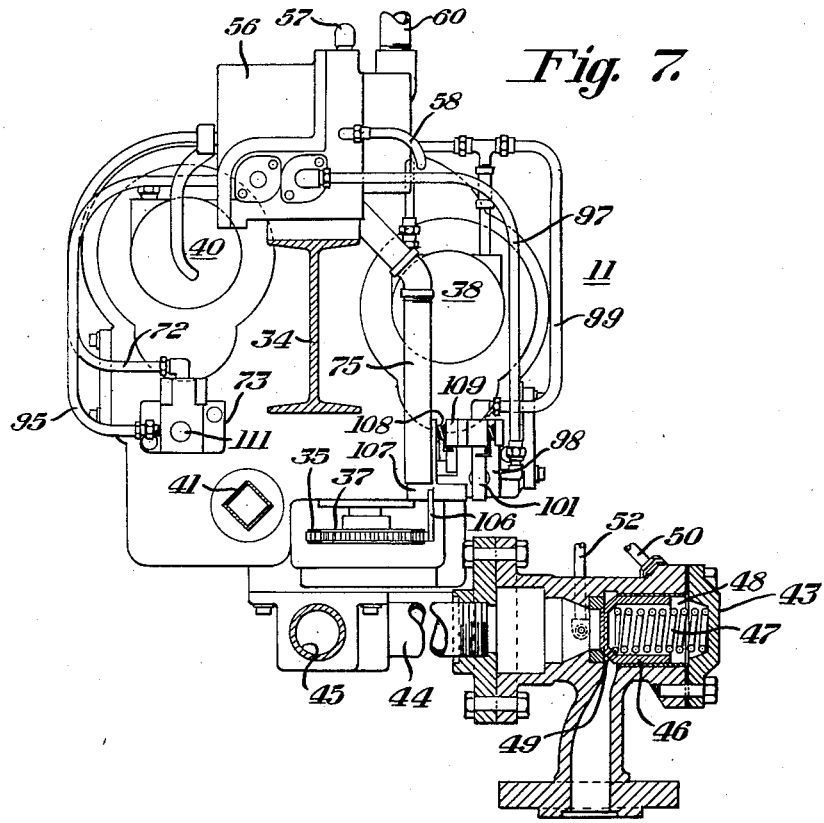
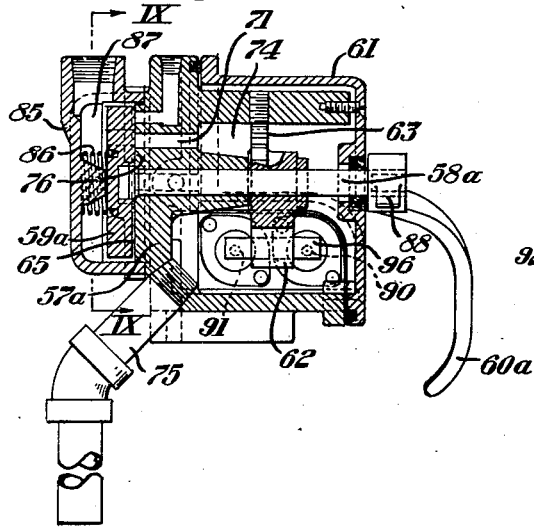
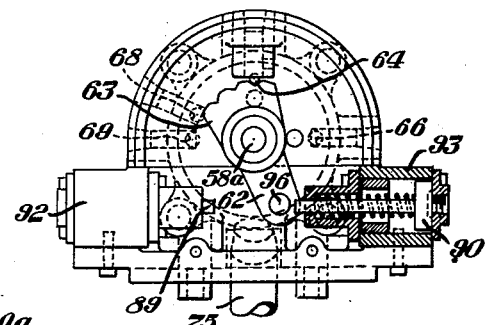

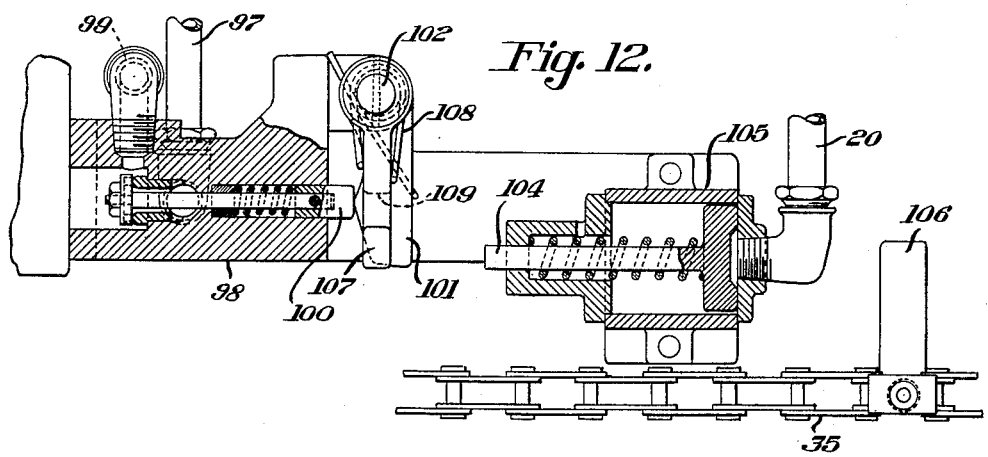
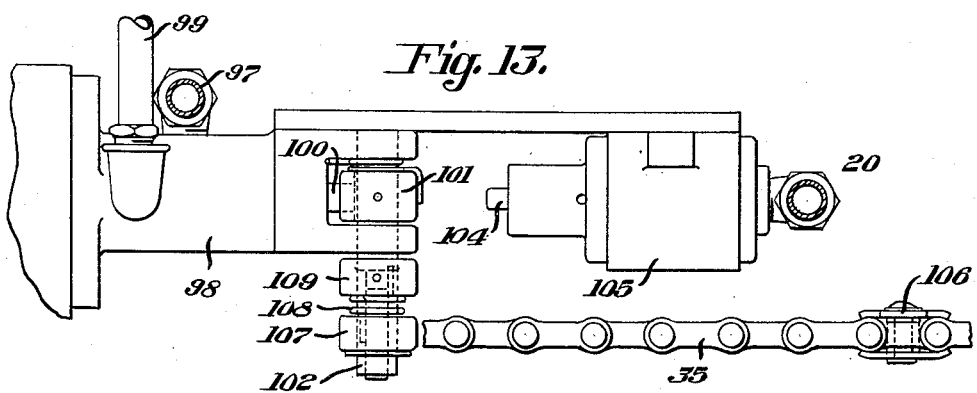
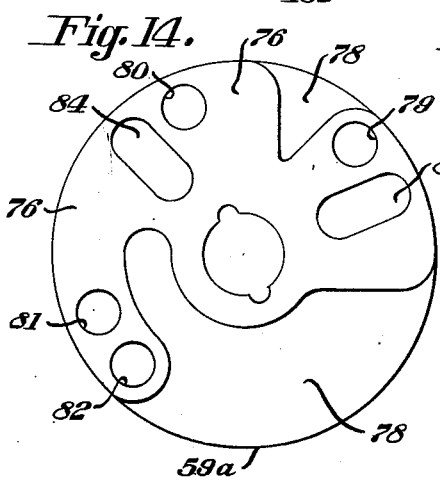
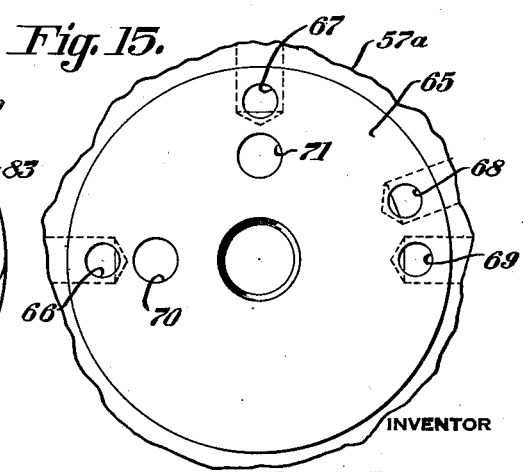

2,696,631

Patented Dec. 14, 1954

2,696,631

RETRACTABLE SOOT BLOWER CONTROL AND OPERATING SYSTEM

De Los E. Hibner, Jr., Du Bois, Pa., assignor to Continental Foundry & Machine Company, East Chicago, Ind., a corporation of Delaware Application January 26, 1952, Serial No. 268,423

13 Claims. (Cl. 15—317)

This invention relates to means and method of controlling and operating one or more units for blowing cleaning fluid, such as retractible soot blowers mounted in boiler-firing chambers.

One form of soot blowing unit has the blower nozzle mounted on a lance which is longitudinally thrust into a furnace chamber while at the same time rotating to direct a concentrated stream of cleaning fluid over a wide area. Such units must have means for initiating the extension movement of the nozzle, and for retracting the nozzle and bringing the unit to a halt at the end of its blowing cycle. The present invention provides a more simple and certain means and method for accomplishing these operations than has heretofore been known in the art. The invention also provides a simple means integrated with the other control and operating means for intervening in the cycle of any blower unit to retract it before it has become fully extended. This is useful, for example, for the purpose of looking at the blower lance to see whether it is becoming overheated, in which case cleaning fluid can be supplied at a greater rate to reduce the temperature of the lance to a safe level. One of the advantages of the retraction control system of the invention is that a single control valve may be used for emergency retraction of a plurality of blower units.

Further novel features and advantages of the soot blower control system of my invention will become apparent from the following detailed description and in the accompanying drawings. For purposes of illustration only, a present preferred embodiment of my invention is shown in the drawings, as follows:

Figure 2 is a diagram of part of the control system for a single blower unit, showing air flow between the valves and motor units of the blower unit during retraction of the blower lance;

Figure 3 is a diagram corresponding to Figure 2, showing air flow while the blower lance is extended;

Figure 4 is a diagram corresponding to Figures 2 and 3, showing the air flow while the blower lance is at rest in retracted position;

Figure 5 is a side elevation of a blower unit controlled by the system of Figure 1;

Figure 6 is a top elevation of the blower unit of Figure 5;

Figure 7 is a section generally on the line VII—VII in Figure 5, with a detached section of the main valve controlling the cleaning fluid from the blower unit;

Figure 8 shows a side elevation of the combination control valve apart from the rest of the blower unit, as viewed from the opposite side of Figure 5;

Figure 9 is a section on the line IX—IX of Figure 10;

Figure 10 is a section on the line X—X in Figure 8;

Figure 11 is a view in elevation of the main body of the combination valve, having the cover removed and with one of the air cylinders in section;

Figure 12 is a side elevation, partially sectioned, of the control valve and actuating means therefor for regular and emergency retraction of the lance (taken from the side of the blower opposite to the side shown in Figure 5);

Figure 13 is a top elevation of what is shown in Figure 12;

Figure 14 is a view of the face of the combination valve disk which bears against the valve body; and Figure 15 is a view of the face of the combination valve body which bears against the valve disk, with adjacent portions of the body broken away.

Figure 1:
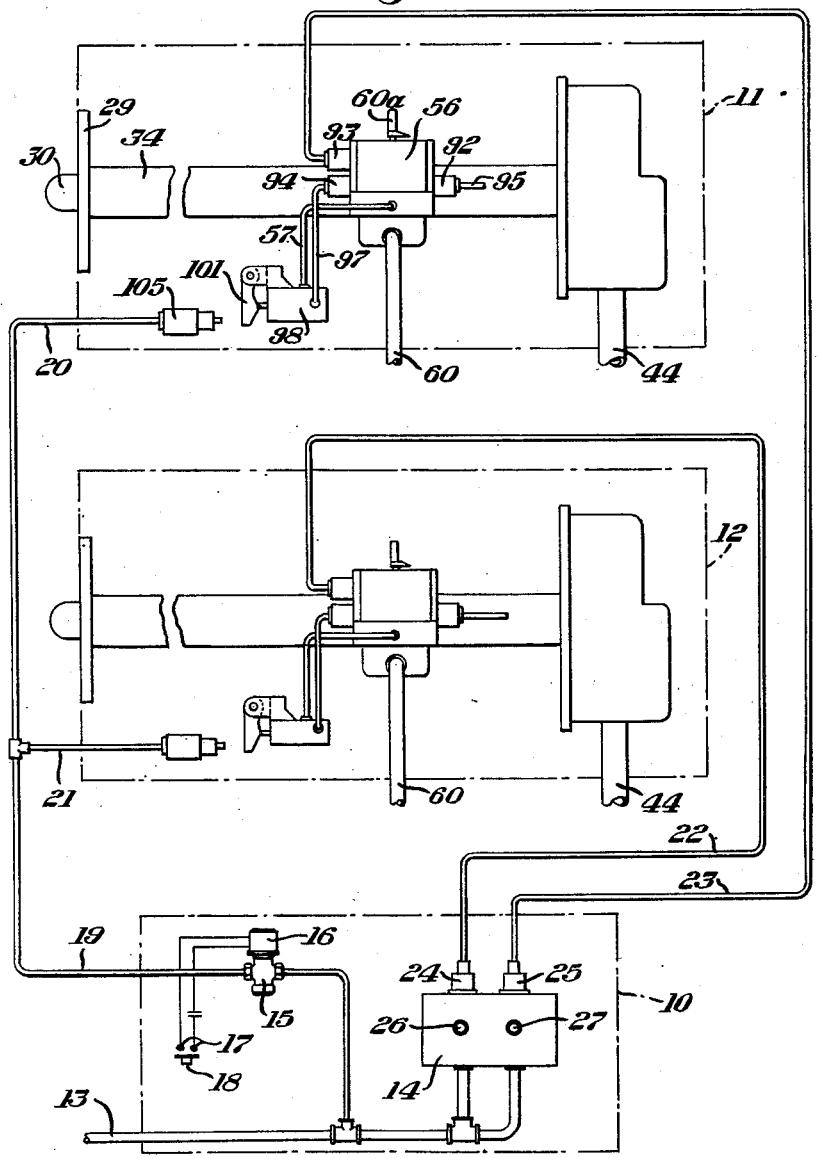
Figure 1 is a diagram of the general arrangement of a multiple soot blower control system in accordance with the invention, with most details of the individual blower unit controls omitted.

Referring in detail to the drawings, the control system shown in Figure 1 comprises a control panel 10 for two soot blower units 11 and 12. A line 13 connects a source of relatively low pressure control air to a control box 14 mounted on the panel 10, and also to an emergency control valve 15 mounted on the control panel 10. The valve 15 is self-seating and is spring-biased closed, and a solenoid 16 opens the valve 15 when a switch 17 on the panel 10 is moved against a spring from open to closed position to energize the solenoid. The switch 17 is manually closed by a button 18 on the panel 10, and may also be closed by any desired electric circuits operating automatically in response to any predetermined conditions in any part of the system. The valve 15 has its inlet connected to line 13 and its outlet connected to a line 19 having branch lines 20 and 21 leading to the blower units 11 and 12.

The control box 14 is illustrated diagrammatically in Figure 1 in a simple form. A pair of parallel air lines 22 and 23 extend through the box 14 from the control air supply line 13 to the respective blower units 12 and 11. Valves 24 and 25 control the respective lines 22 and 23 and are mounted in the box 14. These valves 24 and 25 are self-seating and spring-biased closed, and are opened by manual push buttons 26 and 27 on the panel 10 when it is desired to send short puffs of control air through the lines 22 and 23 for starting the blower units 11 and 12. The box 14 may take the form of a drum controller of the form well known in the art for sending control air signals for automatic successive operation of a series of soot blower units.

*Structure of blower unit 11 (Figures 5–11).*—Referring initially to Figures 5–7, the blower unit 11 has a longitudinally movable lance 28 with a passage therethrough for any fluid soot blowing medium; e. g., steam or compressed air. The lance 28 is extendible through an opening in a wall plate 29 and through a corresponding opening in a wall to which the wall plate 29 is secured, such as the wall of the firing chamber of an industrial boiler or the like. A nozzle 30 (shown diagrammatically) is formed in the projecting end of the lance 28 to release soot blowing medium into the interior of a firing chamber for removal of soot, and the other end of the lane 28 is journaled in a carriage assembly 31. The carriage 31 moves the lance 28 longitudinally into and out of the firing chamber as its supporting trolley 32 rolls its wheels 33 along the lower flange of a horizontal beam 34 forming part of the fixed frame of the blower unit 11. A sprocket chain 35 trained around a pair of sprocket wheels 36 and 37 has a connection with the carriage 31, and a reversible air motor 38 drives the rear sprocket wheel 37 for advancing and retracting the carriage 31 and lance 28. A normally disconnected emergency crank 39 is provided for advancing and retracting the lance 28 manually.

A unidirectional air motor 40 is geared to rotate a square shaft 41 carried in fixed bearings suspended beneath the frame 34. A pair of meshing gears are carried within the body of the carriage 31, one of the gears having a square opening therethrough slidable along but rotatable by the square shaft 41. The other of said gears is secured to the end of the lance 28 journaled in the carriage 31, so that the motor 40 can rotate the lance 28 during its longitudinal movement and in all of its longitudinal positions.

The blower unit 11 receives soot-blowing medium through a supply line 42 and control valve 43 mounted on the fixed frame of the blower unit. The valve 43 discharges into a line 44 and thence into the rear end of a tube 45 which is mounted on the fixed frame of the unit and extends slidably through a gland into the body of the carriage 31 and thence slidably within the lance 28 almost to the wall bracket 29. When the main valve 43 opens, soot-blowing fluid passes through the line 44 and tube 45 into the projecting end of the lance 28 and thence out of the nozzle 30. The movable valve element 46 of the valve 43 is urged into closed position by a spring 47 but when in closed position is urged open by pressure of blowing fluid on the portion of the front face of the valve element 46 extending radially beyond its seat, and this pressure is sufficient to open the valve element 46 against the spring 47 if the rear face of the valve element 46 is subjected to substantially atmospheric pressure. The rear portion of the valve element 46 acts as a piston in a cylindrical chamber 48 which encloses the rear face of the valve element 46 and also accommodates the spring 47. A relatively small bleed orifice 49 through a wall of the valve element 46 permits blowing fluid to pass from the inlet side of the valve element 46 into the chamber 48 to build up equalizing pressure on the rear face of the valve element 46 until it is closed by the spring 47. In order to open the valve element 46 a line 50 is connected to the chamber 48 for release of pressure in the chamber 48. A pilot valve 51 controls the connection between line 50 and a line 52 which discharges into the throat of a Venturi passage on the downstream side of the seat of the valve element 46. The pilot valve 51 is mounted on the beam 34 and its movable valve element is shifted between open and closed positions by rotation of a shaft 53 on which lever arm 54 is keyed. As the lance 28 advances past a predetermined position a stud 55 projecting horizontally from the carriage 31 perpendicular to its line of movement engages the arm 54, opens the pilot valve 51, and continues past the arm 54. Blowing fluid begins to blow from the nozzle 30 and continues to blow until the lance is retracted and the same stud 55 returns past the arm 54 and shifts it in the opposite direction to close the pilot valve 51 and thus close the blowing fluid control valve 43.

A combination disk valve 56 is connected to the traversing air motor 38 by a pair of lines 57 and 58, and to the rotary air motor 40 by a line 59, and controls the flow of power air for these motors from a power air supply line 60 (Figures 2–4). Referring now to Figures 8–11, the valve 56 comprises a valve body 57a mounted on the fixed frame of the unit 11, a shaft 58a journaled in the body 57a, a valve disk 59a secured on one end of the shaft 58a, a handle 60a secured to the other end of the shaft 58a, which projects outside of a cap 61 on the body 57a. An intermediate portion of the shaft 58a carries and is keyed to a member comprising a lever arm 62 extending below the shaft 58a and a circular segment 63 extending above the shaft 58a with three detent notches therein to receive a spring-loaded click-stop detent ball 64 mounted in the body 57a above the circular segment 63. The end of the body 57a facing the disk 59a has a flat annular face 65 with six ports 66–71 extending from the face 65 parallel to the shaft 58a into the body 57a. The ports 66, 67 and 69 are connected to the lines 58, 57 and 59, respectively, and the port 68 connects with a line 72 leading to a stop pilot valve 73. Ports 70 and 71 are spaced radially inwardly from the ports 66 and 67, respectively, and each extends into a chamber 74 within the body 57a and cap 61. The chamber 74 exhausts into the atmosphere through an exhaust line 75.

The disk 59a has a face 76 with a flat surface 77 engaging the face 65 of the body 57a, and recessed surfaces 78 which are out of engagement with the face 65. Four ports 79–82 extend axially through the disk 59a and two radially extending slots 83 and 84 are indented in the disk 59a, within the area of the surface 77. A cover 85 encloses the disk 59a and is secured to the valve body 57a, with a spring 86 between the cover 85 and disk 59a to press the disk 59a against the face 65 of the body 57a. The cover 85 forms a chamber 87 connecting the rear ends of the disk ports 79—82 with the power air supply line 60.

The handle 60a has an integral pointer 88 adapted to point to the words "stop", "extend", and "retract" lettered on the outside of the cap 61 as the handle moves to its three different operating positions and the detent ball 64 correspondingly moves into the three different notches in the segment 63 on the shaft 58a. When the pointer 88 shows "stop" the flat face 77 of the disk 59a seals all of the ports 66—71 of the body 57a. When the handle 60a is turned to "extend" position the disk port 81 registers with the valve body port 69 to release power air from the line 60 to the line 59 to operate the rotary motor 40; the disk port 80 registers with the body port 67 to connect the power air line 60 to the line 57 to rotate the traversing motor 38 in the direction to extend the lance 28 into the furnace chamber; and the disk slot 83 connects the body ports 66 and 70 to establish a return flow of exhaust air from the motor 38 through the line 58 to the exhaust line 75. The other ports and slots of the disk 59a and body 57a are inactive during this period. When the handle 60a is turned to "retract" position the disk port 82 registers with the body port 69 to pass power air from the line 60 to the line 59 to operate the rotary motor 40; the disk port 81 registers with the body port 68 to pass power air from the line 60 to the line 72, which in effect cocks the stop pilot valve 73 in readiness to be triggered as hereinafter described for stopping the lance when it is fully retracted; the disk slot 84 connects the body ports 67 and 71 to pass returning air from the traversing motor 38 through the line 57 to the exhaust line 75; and the disk port 79 registers with the body port 66 to pass power air from the line 60 to the line 58 to rotate the traversing motor 38 in a direction to retract the lance 28 from the firing chamber.

*Elements for shifting combination valve disk 59a.*— The disk 59a of combination valve 56 can be shifted manually by means of the handle 60a but it is ordinarily shifted by pistons 89—91 relatively loosely slidable in cylinders 92—94 mounted on the body 57a (e. g., Figures 1, 10 and 11). When compressed air is supplied to the piston 92 through a line 95 from valve 73 an extension of the piston 89 engages a bar 96 carried by the lever arm 62 (Figure 10) and swings the arm 62 and shaft 58a to "stop" position. When pressure in the line 95 is relieved a spring in the cylinder 92 retracts the piston 89 out of engagement with the lever arm 62, as air caught in the cylinder leaks out past the piston. The other two pistons 90 and 91 are mounted on the other side of the lever arm 62 and as the piston 90 extends it has a projection which engages the bar 96 to swing the lever arm 62 and shaft 58a to "extend" position. A stop such as a ring in the non-pressure end of the cylinder 93 prevents the piston 90 from rotating the shaft 58a past "extend" to "retract" position. The piston 91 has no such stop and when extended engages the bar 96 and rotates the shaft 58a to "retract" position. The pistons 90 and 91 are spring biased out of engagement with the bar 96 and air caught in the corresponding cylinder leaks past the piston as it retracts. The piston 90 is operated by signal air received by the cylinder 93 through the line 23 when the panel button 27 is pressed for the short time necessary to operate the piston 90. The piston 91 is operated by power air supplied to the cylinder 94 through a line 97 from a pilot valve 98.

The valve 98 is connected to receive power air through a line 99 from the line 57, and is normally spring biased closed to prevent flow from the line 99 to the line 97 and piston 91. The combination valve 56 is shifted to "retract" position when a projecting valve stem 100 of the valve 98 is pressed by an arm 101 pinned on a rock shaft 102, which opens the valve 98. A piston 104 in a cylinder 105 connected to the emergency control line 20 (Figure 1) is extensible to engage the arm 101 and through it to open the valve 98 when the emergency panel button 18 is pressed to operate the solenoid 16 to open the valve 15. When the valve 15 is closed the piston 104 is spring retracted while air caught in the cylinder 105 escapes past the relatively loose fitting piston. The arm 101 is independently operable during the regular cycle of the blower unit 11 when a traveling finger 106 secured to the chain 35 engages and presses against an arm 107 journalled on the rock shaft 102. The arm 107 rotates the rock shaft 102 through a coil spring 108 which is engaged by the arm 107 and pressed against an arm 109 pinned to the rock shaft 102. The arm 107 is free to swing back in the opposite direction in case the finger 106 passes beyond it before the retraction of the lance 28 begins following opening of the valve 98. The body of the valve 98 is mounted at the rear end of the fixed frame of the blower unit 11 and consequently the traveling finger 106 is mounted on the opposite side of the chain 35 from the connection of the chain 35 with the carriage 31, so that as the carriage 31 and lance 28 advance in the direction of the firing chamber the finger 106 moves in the opposite direction until it engages the arm 107 and opens the valve 98 to begin the retracting movement of the lance 28.

Once the valve 98 has been opened and the combination valve 56 has been rotated to "retract" position the lance 28 continues to retract until an abutment 110 on the body of carriage 31 engages a projecting valve stem 111 of the valve 73, and thereby opens the valve 73 to actuate the piston 89 to shift the combination valve 56 to "stop" position.

The other blower unit 12 is of similar construction, and other blower units can be controlled in the same way by adding additional connections to the box 14 and valve 15.

*Operation of the system.*—When the units 11 and 12 are both at rest, either or both of them may be set into operation by pressing the panel control buttons 26 and 27, respectively, or by manually operating the handles of the combination valves on these units (valve 56 in unit 11). When the control button 27 is pressed the combination valve 56 is shifted to "extend" position by control air through the line 23, actuation of the piston 90 in cylinder 93, rotation of the shaft 58a and valve disk 59a to the intermediate "extend" position, and flow of power air from the supply line 60 through disk port 80, valve body port 67, line 57, traversing motor 38, with the motor exhaust returning through line 58, body port 66, disk slot 83, body port 70, chamber 74 and exhaust line 75. At the same time power air from the line 60 flows through disk port 81, valve body port 69, end line 59 to motor 40 to rotate the lance 28. As soon as the nozzle 30 is within the firing chamber the movement of the carriage 31 carries its projecting stud 55 against the arm 54 and opens the pilot valve 51, which in turn opens the main steam valve 43 to start a flow of steam through the lance 28 and nozzle 30. It is sometimes desirable to check the temperature of the lance 28 as it advances into the firing chamber, and for this purpose the panel control button 18 may be pressed to open the valve 15, which, through piston 104, arm 101, and valve 98 extends the piston 91 in the cylinder 94, rotates the combination valve 56 to "retract" position, and thereby establishes a flow of power air from the line 60 to disk port 79, body port 66 and line 58 to the traversing motor 38. The motor 38 then retracts the lance 28, while exhausting through line 57, body port 67, disk slot 84, body port 71, chamber 74 and exhaust line 75, and power air is also supplied from the line 60 through disk port 82, body port 69 and line 59 to motor 40 to continue rotation of the lance 28 during retraction. When the combination valve 56 is set at "retract" position line 60 is also connected to the stop pilot valve 73 through disk port 81, body port 68 and line 72, so that when the abutment 110 on the retracting carriage 31 strikes the valve stem 111 the valve 73 opens and power air from line 60 passes through valve 73 and line 95 to extend piston 89 in cylinder 92, thereby swinging the lever arm 62, shaft 58a and valve disk 59a to "stop" position. This shuts off the power supply line 60 from the power lines to the motors 38 and 40 and the lance 28 thereupon ceases to retract and rotate until the next time the unit is started on its cycle. As the nozzle 30 is about to be withdrawn from the firing chamber the projecting stud 55 on the carriage 31 swings the arm 54 to close the pilot valve 51 and the supply of soot-blowing medium is cut off by the valve 43 before the lance 28 comes to rest. In short, whenever the emergency panel button 18 is pressed piston 104 in cylinder 105 and pilot valve 98 operate to retract the lance 28 back to its fully retracted position, regardless of what position the lance 28 may be in when the emergency button is pressed. The valve 15 is connected in parallel to similar cylinders 105 in the blower unit 12, and to any desired number of additional blower units, and has the same control over all of the connected units.

If the panel control button 18 is not pressed then the lance 28 continues to advance until the traveling chain finger 106 reaches the arm 107 and opens the valve 98. The lance 28 then begins to retract, while continuing to rotate and blow cleaning fluid, until the supply of cleaning fluid is cut off and the lance comes to rest at the "stop" position, as just described. When the combination valve disk 59a shifts to "stop" position the supply of power air to the line 72 is cut off and the release of the compressed air in the cylinder 92 past the piston 89 permits the piston 89 to retract under the influence of its spring, even though the abutment 110 continues to engage the valve stem 111 to hold the valve 73 open until the carriage 31 again advances to extend the lance 28. As soon as the piston 89 is retracted, the combination valve 56 is again ready to be operated by the piston 90 in the cylinder 93 connected to the panel control button 27.

While I have illustrated and described a present preferred embodiment of the invention, it will be recognized that the invention is not limited thereto but may be otherwise embodied and practiced within the scope of the following claims.

I claim:

1. A soot blower apparatus comprising a fixed frame, a carriage supported for movement on the frame, a blower lance secured to the carriage and adapted to advance and retract longitudinally and to rotate, with a passage through the lance for flow of soot-cleaning medium, a valve controlling said passage and means for opening and closing said valve controlled by movement of the lance, a fluid-actuated reversible motor connected to move the lance longitudinally, a pair of conduits connected to the reversible motor to drive in one direction as one conduit feeds power fluid to the motor and in the other direction when the other conduit feeds power fluid to the motor, a second fluid-actuated motor connected to rotate the lance, a feed conduit connected to the second motor, and a combination valve mounted on the fixed frame, said combination valve comprising a valve body having an inlet chamber adapted to be connected to a source of motor-actuating fluid under pressure, a valve disk movably mounted in the body and having passages adapted when the disk is in a first position to connect the inlet chamber with one of said pair of conduits and with the feed conduit of the second motor in order to advance and rotate the lance, and when the disk is moved to a second position to connect the inlet chamber with the other of said pair of conduits and with the feed conduit of the second motor in order to retract and rotate the lance, said disk being movable to a third position in which it blocks flow of fluid from the inlet chamber to each of said conduits in order to stop movement of the lance.

2. Apparatus according to claim 1 with means connected to move with the carriage and means engageable therewith to shift the valve disk to its second, lance-retracting position as the lance comes to the end of its predetermined advancing movement, and to shift the valve disk to its third, lance-stopping position as the lance comes to the end of its predetermined retracting movement.

3. Apparatus according to claim 1, with a fluid-actuated piston operable to move the disk to its second, lance-retracting position, a conduit connecting said piston through a port in said disk with the inlet chamber when the disk is in its first, lance-extending position, a normally closed valve in said conduit, means to open the valve, and a member connected to move in coordination with the lance and adapted to engage said means to open the valve when the lance approaches the predetermined end of its advancing movement, thereby automatically starting the retracting movement of the lance.

4. Apparatus according to claim 3, comprising a sprocket chain trained around a pair of sprocket wheels and connected to be driven by said reversible motor, said carriage being connected to one flight of said chain, said member being connected to the other flight of the chain, and said valve being mounted adjacent the rear end of the fixed frame toward which the lance retracts.

5. Apparatus according to claim 3, in which said valve opening means is also operable independently by means connected to a control panel.

6. Apparatus according to claim 3 with means to move the disk valve to its third, lance-stopping position, comprising a piston connected to move the disk to its third position, a conduit connected to actuate the piston and to receive power fluid from the inlet chamber through the valve disk when the disk is in its second, lance-retracting position, a normally closed valve in the latter conduit, and means movable in coordination with the carriage to open the latter valve as the lance comes to the end of its predetermined retracting movement.

7. Soot blower apparatus comprising a fixed frame, a carriage supported for movement on the frame, a blower lance secured to the carriage and adapted to advance and retract longitudinally and to rotate, with a passage through the lance for flow of soot cleaning medium, a valve controlling said passage and means for opening and closing said valve controlled by movement of the lance, a fluid-actuated reversible motor connected to move the lance longitudinally, first and second conduits connected to the reversible motor to drive in one direction to advance the lance as the first conduit feeds power fluid to the motor while the second exhausts power fluid from the motor and in the other direction to retract the lance when the flow through these conduits is reversed, a second fluid-actuated motor connected to rotate the lance, a third conduit connected to the second motor, and a combination valve mounted on the fixed frame, said combination valve comprising a valve body having an inlet chamber adapted to be connected to a source of motor-actuating fluid under pressure, an exhaust chamber opening to the atmosphere, and a valve disk journaled in the body and having passages therethrough adapted when the disk is in a first position to connect the inlet chamber with said first and third conduits in order to advance and rotate the lance, with a groove in the face of the disk nearest the exhaust chamber disposed to receive fluid being exhausted from the said second conduit and to direct it to the exhaust chamber, and said valve disk passages being adapted when the disk is moved to a second position to connect the inlet chamber with the said second and third conduits in order to retract and rotate the lance, with a second groove in the face of the disk nearest the exhaust chamber disposed to receive fluid being exhausted from the said first conduit and to direct it to the exhaust chamber, said disk being movable to a third position in which it blocks flow of fluid from the inlet chamber to each of said conduits in order to stop movement of the lance.

8. Apparatus according to claim 7, in which the combination valve body has a flat surface bearing against the face of the disk nearest the exhaust chamber, said latter face having a ported and grooved flat surface bearing against the said flat surface of the valve body and relieved along part of said disk face to reduce the area of the disk face in contact with the valve body.

9. A multiple unit soot blowing system, comprising a plurality of blower units, each of said blower units having a blower lance and a reversible fluid-actuated motor for advancing and retracting the lance, a disk valve controlling flow of actuating fluid to the motor and movable to three positions for advancing, retracting and stopping movement of the blower lance, having means operable to shift the disk valve from lance-advancing to lance-retracting position, having a fluid-actuated piston to cause said means to operate, and having means for shifting each disk valve from retracting position to stop position at the end of the retracting movement, a central control panel, a source of signal compressed air for the panel, a series of conduits connected to operate the said pistons of the respective blower units, a common conduit connected to said source and to said series of conduits, a normally closed special control valve controlling said common conduit, and means operable from the panel to open said special control valve for actuating each piston and thereby causing the lance of each blower unit then going through any part of its operating cycle to retract and stop.

10. Apparatus according to claim 9 with a second fluid-actuated piston for each unit operable to cause the disk valve to shift from lance-stopping to lance-extending position, a separate conduit connecting each said second piston to the source of signal compressed air, a separate normally closed valve controlling the latter conduit, and separate means operable from the control panel to open the latter valve for actuating the second piston and thereby causing the lance of the corresponding blower unit to begin to extend.

11. Apparatus according to claim 9 in which the means for shifting the disk valve from lance-extending to lance-retracting position comprises another fluid-actuated piston, a conduit connecting the latter piston to the disk valve, the disk valve being adapted to supply part of the motor-operating fluid under pressure to said latter piston through the conduit connected thereto only when the disk valve is in lance-extending position, and a normally closed valve in said conduit adapted to be opened by the piston connected to the special control valve in the common conduit when the special control valve is opened.

12. Soot blower apparatus comprising a fixed frame, a carriage supported for movement on the frame, a blower lance secured to the carriage and adapted to advance and retract longitudinally and to rotate with a passage through the lance for flow of soot-cleaning medium, a valve controlling said passage and means for opening and closing said valve controlled by movement of the lance, a fluid-actuated reversible motor connected to move the lance longitudinally, first and second conduits connected to the reversible motor to drive in one direction to advance the lance as the first conduit feeds power fluid to and the second conduit exhausts it from the motor and in the other direction to retract the lance when the flow through these conduits is reversed, and a combination valve mounted on the fixed frame, said combination valve comprising a valve body having an inlet chamber adapted to be connected to a source of motor-actuating fluid under pressure, an exhaust chamber connected to atmosphere, with a portion of the valve body separating said chambers, a disk journaled in the body and disposed between the inlet chamber and said body portion with a face of the disk slidable against a face of said body portion, said body portion having first and second passages extending from its said face to said first and second motor conduits and second and third passages extending from its said face to the exhaust chamber, said disk having ports therethrough and grooves in its said face, and said disk being rotatable to a lance-advancing position in which one of said ports registers with said first passage and one of said grooves connects said second and third passages, to a lance-retracting position in which one of said ports registers with said second passage and one of said grooves connects said first and fourth passages, and to a lance-stopping position in which the disk ports are each blocked by said body face.

13. Apparatus according to claim 12 with a handle connected to rotate the disk valve, said handle being manually operable and exposed to give a visible indication of the setting of the disk valve for advancing, retracting or stopping the blower lance.

References Cited in the file of this patent

UNITED STATES PATENTS

| Number | Name | Date |
|---|---|---|
| 2,303,152 | Weeks | Nov. 24, 1942 |
| 2,327,524 | Hibner et al. | Aug. 24, 1943 |
| 2,504,073 | Hibner et al. | Apr. 11, 1950 |
| 2,529,656 | Hettelsater | Nov. 14, 1950 |

FOREIGN PATENTS

| Number | Country | Date |
|---|---|---|
| 636,052 | Great Britain | Apr. 19, 1950 |